No. 663,741. Patented Dec. 11, 1900.
M. F. EWEN.
APPARATUS FOR MANUFACTURING PRISMATICALLY RIDGED GLASS.
(Application filed July 24, 1900.)
(No Model.) 3 Sheets—Sheet 1.

No. 663,741. Patented Dec. 11, 1900.
M. F. EWEN.
APPARATUS FOR MANUFACTURING PRISMATICALLY RIDGED GLASS.
(Application filed July 24, 1900.)
(No Model.) 3 Sheets—Sheet 2.
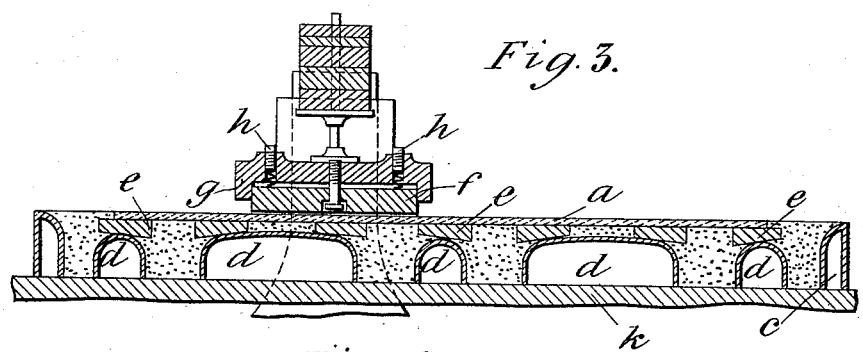
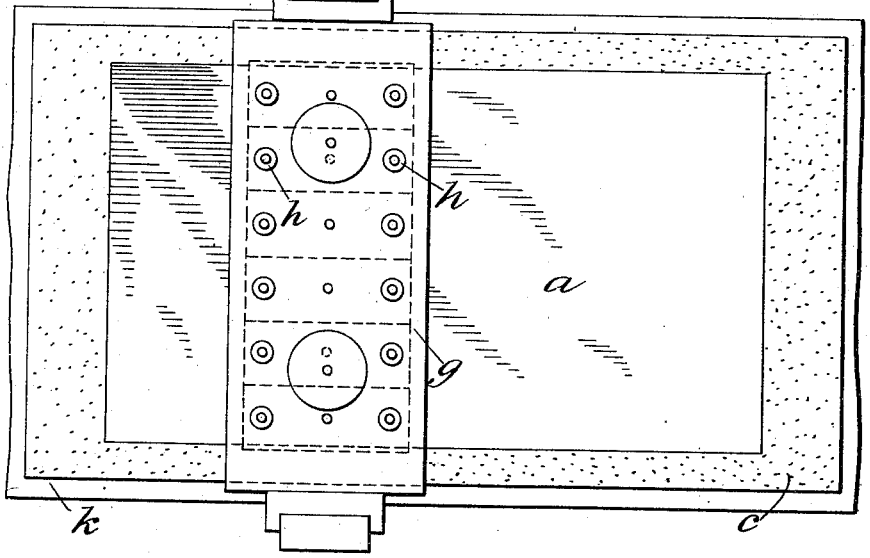
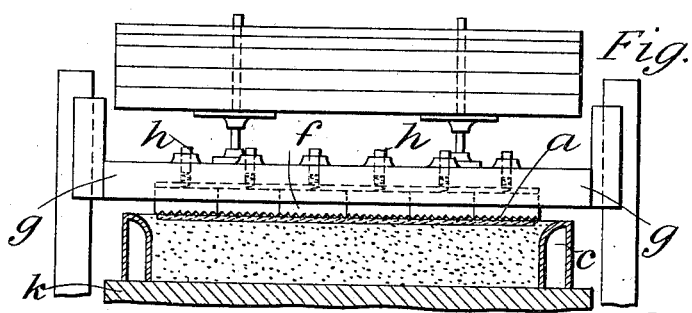

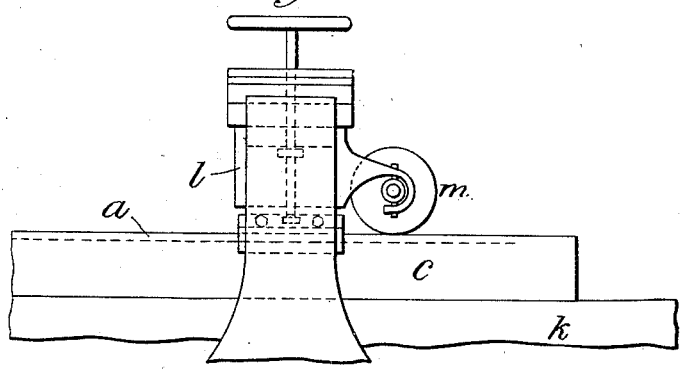
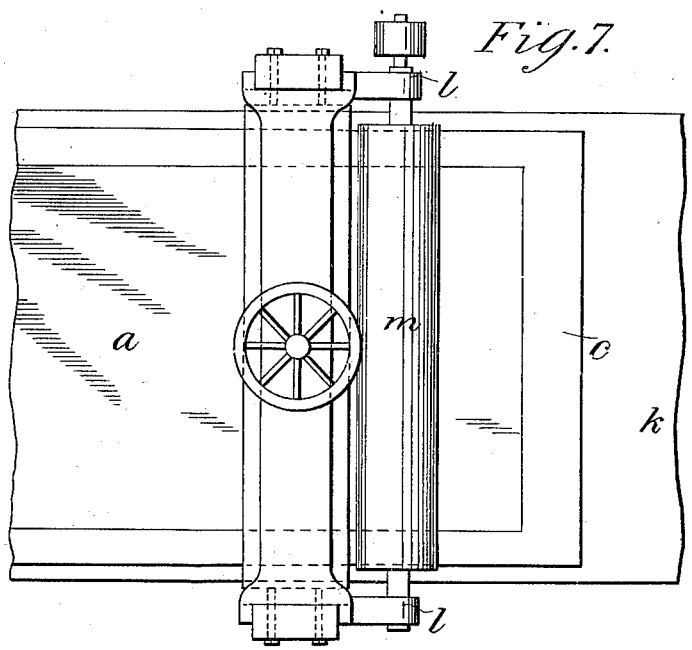

UNITED STATES PATENT OFFICE.

MALCOLM F. EWEN, OF LONDON, ENGLAND, ASSIGNOR TO THE GRACE-CHURCH SYNDICATE, LIMITED, OF SAME PLACE.

APPARATUS FOR MANUFACTURING PRISMATICALLY-RIDGED GLASS.

SPECIFICATION forming part of Letters Patent No. 663,741, dated December 11, 1900.

Original application filed May 18, 1900, Serial No. 17,120. Divided and this application filed July 24, 1900. Serial No. 24,729. (No model.)

*To all whom it may concern:*

Be it known that I, MALCOLM FAULKNER EWEN, architect, a citizen of the United States of America, residing at No. 144 High Holborn, London, England, have invented a certain new and useful Apparatus for the Manufacture of Prismatically-Ridged Glass, (for which applications for a patent have been made in Belgium, May 14, 1900; in Germany, May 14, 1900; in Austria, May 14, 1900; in Hungary, May 14, 1900; in France, May 14, 1900; in Canada, May 22, 1900, and in Great Britain, May 14, 1900, No. 8,871,) of which the following is a specification.

This invention was originally included in my application filed May 18, 1900, Serial No. 17,120, but has been made the subject of a fresh application, a division having been required.

In the above-named application I describe a method of manufacturing glass plates or sheets having parallel prismatic ridges for the purpose of refracting and reflecting light in desired directions, as through windows or into basements or other places into which but little light can directly enter.

Prismatically-ridged glass sheets or plates have been made by rolling or pressing the glass while in a plastic condition, with the result that the ridges and furrows have their angles more or less rounded, and therefore a certain amount of the surface does not act prismatically to give the light the desired direction.

Now according to my invention I cut out the furrows so that they and the ridges have their angles quite sharp, the whole surface being thus available for directing the light.

In carrying out my invention I proceed as I shall describe with reference to the accompanying drawings, which show apparatus suitable for operating according to my invention.

Figure 1:
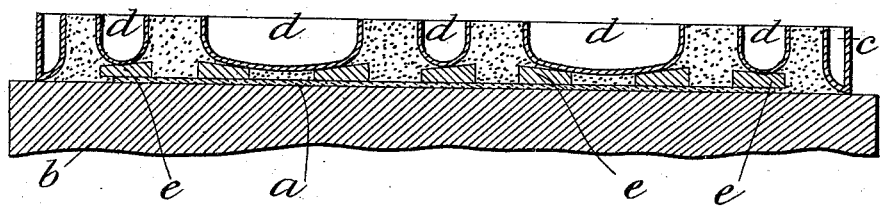
Figure 2:
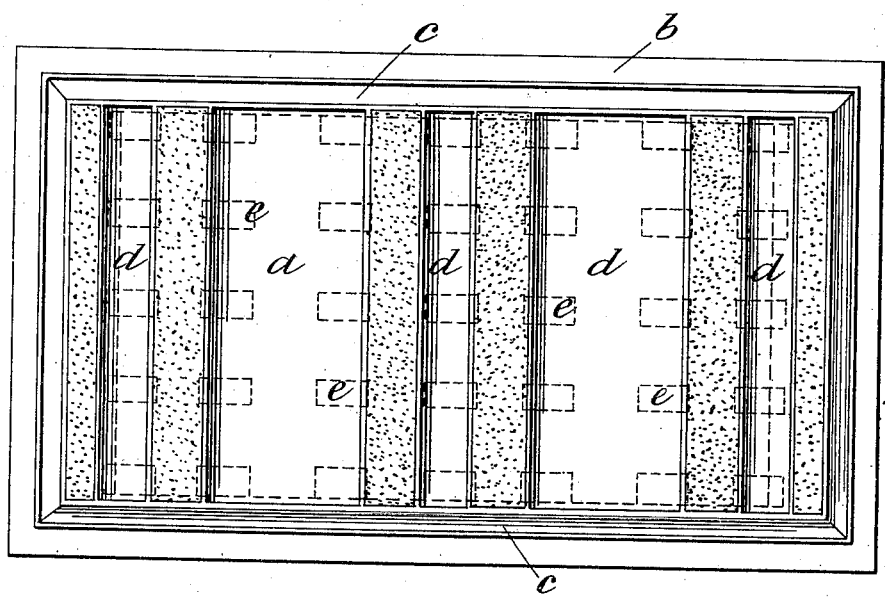

Figure 1 is a longitudinal section, and Fig. 2 is a plan, of a bed for the sheet of glass to be operated on. Fig. 3 is a section, Fig. 4 is a plan, and Fig. 5 is a front view, of the grinding apparatus, Fig. 5ᵃ being a transverse section of one of the grinding-tools. Fig. 6 is a side view, and Fig. 7 is a plan, of the polishing apparatus.

I lay the glass sheet or plate $a$ on a truly-flat slab or table $b$, with the face that is to be cut downward. Over this I place a rather heavy rectangular metal frame $c$, having the upper and lower edges of its sides and ends planed true and parallel. From side to side extend cross-ribs $d$, forming a grating; but these ribs are not so deep as the sides, so that their lower edges are some distance above the glass. Where the glass locally bulges more or less upward I insert wedges $e$ under the ribs, so as to strain the bulges down, and then into the frame I pour a heated cementing composition consisting principally of wax and pitch or such like materials. This on cooling sets on the glass, holding it firmly on the frame.

I prepare a number of grinding-tools, each consisting of a piece of steel bar $f$ two or three inches wide and six or seven inches long, more or less, these pieces having their sides and ends planed true and having their faces grooved and ridged to the shape of the ridges and grooves to be formed on the glass. I place these tools side by side in a frame $g$, having a cover provided with adjusting-screws $h$ for each tool, each screw having preferably a spring interposed between it and the tool.

I fix the frame $c$, holding the glass, as shown in Fig. 3, on the table $k$ of a planing-machine, the glass uppermost, and above it I place the frame $g$, holding the tools, this frame being arranged to slide in vertical guides formed on or carried by the framing of the planing-machine. I turn the adjusting-screws $h$, preferably by the finger and thumb, until I feel that they all press about equally on the tools, and then I load the frame $g$ with weights. The surface of the glass $a$ being served with moistened emery or other suitable grinding powder it is moved to and fro under the tools, and thus it becomes grooved, the tool-frame $g$ being more or less loaded as the work goes on.

I may after a certain amount of rough grooving employ finer grinding material either with the same or with sharper tools, so as to get the ridges and furrows into smoother condition. After the grooving is completed I remove the tool-frame g and substitute a frame l, carrying a polishing-roller m, which is caused to revolve while the glass moves to and fro under it. This roller is preferably made of leather having its periphery suitably grooved, and as it revolves while the glass is served with suitable polishing-powder it smoothes and polishes the faces of the prismatic ridges.

Instead of making the polishing-roller in one continuous length I may employ a number of short polishing-rollers, each separately mounted and capable of being from time to time shifted laterally, each polishing one part of the width of the sheet and then being moved to polish another part. In this case each of the short rollers has on its axis a pulley driven by a band from a drum above. After the glass is polished warm water is poured over it. This softens the cement, so that the glass is left free and can be removed.

Obviously instead of moving the glass to and fro under the grinding-tools these might be moved to and fro while the glass remains stationary.

Having thus described the nature of this invention and the best means I know of carrying the same into practical effect, I claim—

1. In apparatus for manufacturing prismatically-ridged glass a frame made with parallel faces and transverse ribs adapted to be placed upon a sheet of glass, wedges adapted to be inserted between the ribs and the glass, and cement for bedding and holding the glass substantially as described.

2. In apparatus for manufacturing prismatically-ridged glass, tools ridged on their faces in combination with a stationary frame for holding them, bolts adapted to retain the tools and screws and springs adapted to regulate their pressure, and means of moving the glass to and fro under the tools, substantially as described.

3. In an apparatus for manufacturing prismatically-ridged glass, a frame adapted to be reciprocated and carry a sheet of glass, a tool-carrying frame arranged above the same, a series of tools adjustably connected to the said tool-frame, a series of removable weights mounted upon said frame, and separate means carried by said tool-frame for regulating the pressure of the said tools upon said sheet of glass.

4. In an apparatus for manufacturing prismatically-ridged glass, a frame carrying a suitable cement for securing a sheet of glass thereto, a tool-frame mounted above said frame, a series of tools, means for adjustably connecting said tools to said tool-frame, means carried by the tool-frame for regulating the pressure of said tools, a series of removable weights mounted upon said frame, and a polishing-roller.

5. In an apparatus for manufacturing prismatically-ridged glass, a tool-frame, a series of tools adjustably mounted therein, means carried by said frame and engaging said tools for regulating the pressure thereof, and means for supporting a series of weights upon said frame.

In testimony whereof I have hereunto set my hand in presence of two subscribing witnesses.

MALCOLM F. EWEN.

Witnesses:
WALTER J. SKERTEN,
GERALD L. SMITH.